Feb. 22, 1927.　　　　　　　　　　1,618,636
F. BONCHINA
MOUSE OR RAT TRAP
Filed Nov. 5, 1926　　　　2 Sheets-Sheet 1

Inventor
Frank Bonchina.
By Bryant & Lowry
Attorneys

Feb. 22, 1927.
F. BONCHINA
MOUSE OR RAT TRAP
Filed Nov. 5, 1926
1,618,636
2 Sheets-Sheet 2
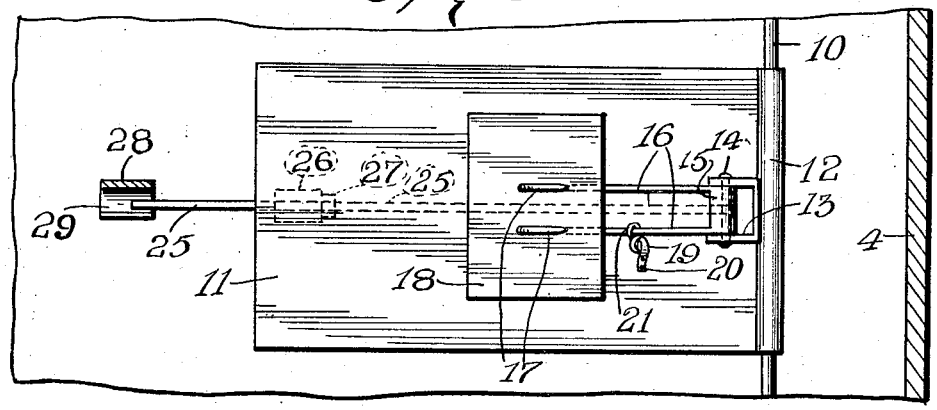
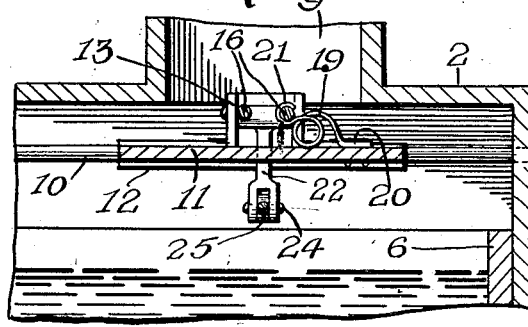
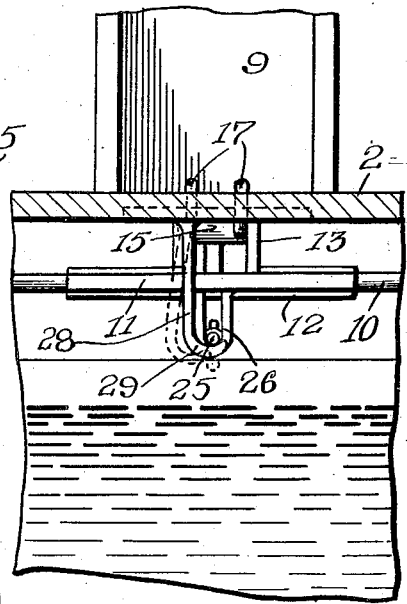
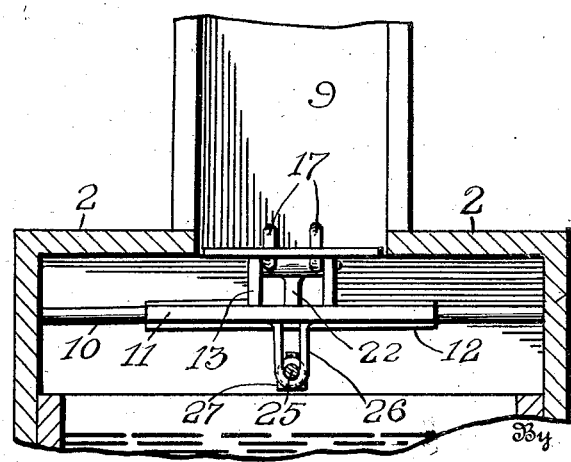
Inventor
Frank Bonchina.
By Bryant & Lowry
Attorneys Patented Feb. 22, 1927.

1,618,636

UNITED STATES PATENT OFFICE.

FRANK BONCHINA, OF CAIRNBROOK, PENNSYLVANIA.

MOUSE OR RAT TRAP.

Application filed November 5, 1926. Serial No. 146,473.

This invention relates to certain new and useful improvements in mouse or rat traps of the type wherein a rodent is precipitated into a water receptacle for drowning with a weighted and balanced trip platform disposed above the water receptacle.

The primary object of this invention relates more particularly to the trip platform and the operating devices therefore that are associated therewith for holding the trip platform in its upper horizontal position with devices for releasing the platform by the weight of a rodent upon a bait plate to permit downward swinging movement of the platform for precipitation of the rodent into the water receptacle therebeneath.

With the above and other objects in view that will become apparent as the nature of the invention is better understood, the same consists in the novel form, combination and arrangement of parts hereinafter more fully described, shown in the accompanying drawings and claimed.

In the accompanying drawings, wherein like reference numerals are employed to designate corresponding parts throughout the several views, Figure 1 is a top plan view of a trap constructed in accordance with the present invention;

Figure 2 is a vertical longitudinal sectional view taken on line 2—2 of Figure 1 showing the water receptacle removably mounted in the trap body, the pivotally mounted trip platform with the devices associated therewith for holding the same in its horizontal position, the trip platform being illustrated by dotted lines in its released position for swinging movement downwardly;

Figure 3 is a horizontal sectional view taken on line 3—3 of Figure 2 showing the bait plate above the trip platform;

Figure 4 is a detail sectional view taken on line 4—4 of Figure 2 showing the coiled spring for holding the bait plate elevated in its trip platform releasing position;

Figure 5 is a detail sectional view taken on line 5—5 of Figure 2; and

Figure 2:
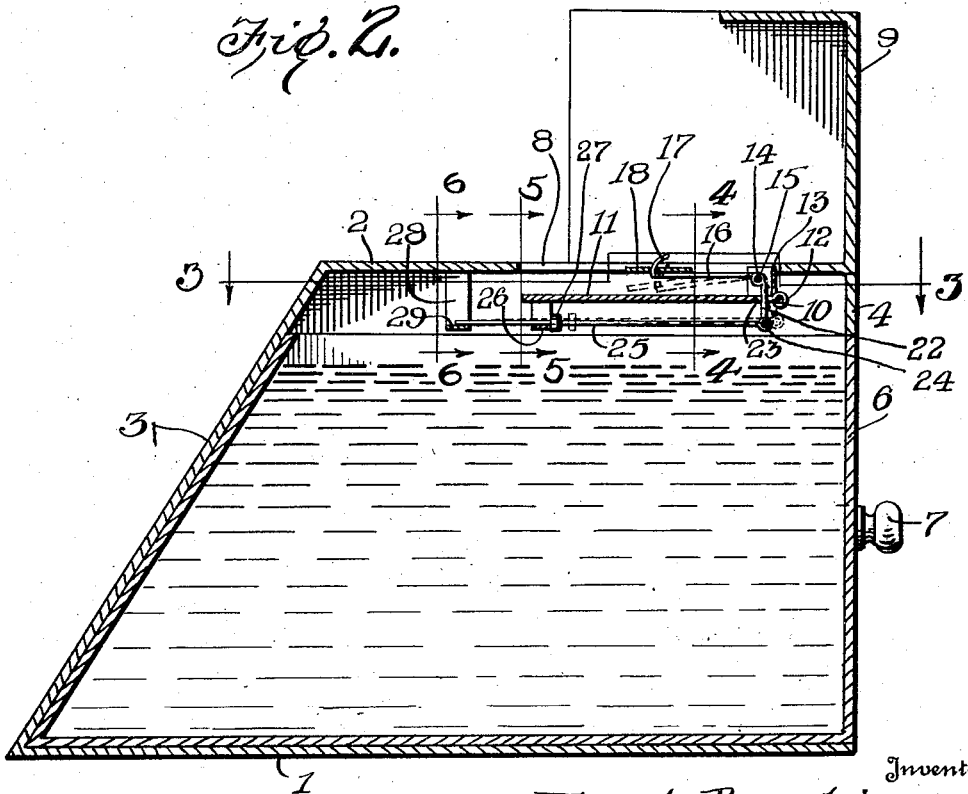

Figure 6 is a detail sectional view taken on line 6—6 of Figure 2 showing the spring finger forming a keeper for the sliding latch rod carried by the trip platform to retain the latter in its elevated set position, the spring finger being illustrated by dotted lines in its position during upward movement of the trip platform.

Figure 1:
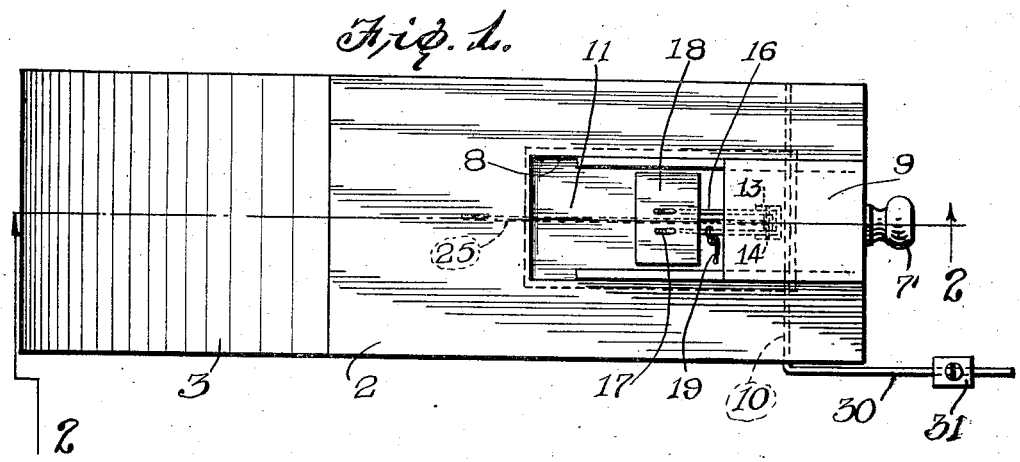

As shown more clearly in Figures 1 and 2, the trap comprises a casing, preferably constructed of the design illustrated and embodying a bottom wall 1, top wall 2, front and rear end walls 3 and 4 and side walls 5, the rear end wall 4 having a relatively large opening therein for the reception of the water receptacle 6 that is readily removable from the trap casing by the handle 7. The top wall 2 of the trap casing is provided with an opening 8 within which a pivotally supported downwardly swinging trip platform is mounted while a hood 9 disposed at the rear side of the trap and above the top wall 2 constitutes means to prevent the escape of a rodent when being precipitated through the opening 8 into the tank 6, the hood 9 being open at its forward side as illustrated.

The trip platform and mechanism associated therewith includes a shaft 10 extending between the side walls 5 of the trap casing adjacent the upper end and in proximity to the rear end of the opening 8 and upon which shaft the trip platform 11 is pivotally supported by the strap bearing 12. A U-shaped support 13 is secured to the upper side of the platform 11 centrally of the pivoted end thereof with a pin 14 extending across the support. A lever in the form of a bell crank is pivotally supported as at 15 upon the pin 14 and comprises two relatively long arms 16 extending above the platform 11 with the outer ends of the arms 16 bent upwardly and rearwardly to form hooks 17 as bait holders with the hooks extending through and supporting a bait plate 18 above the platform 11. The bait plate 18 and lever arms 16 are influenced in an upward direction away from the platform 11 by the coiled spring 19 that is anchored as at 20 at one of its ends to the platform 11 while the other end thereof is secured as at 21 to one of the arms 16 of the leg.

The bell crank lever carries a depending leg 22 that passes through an opening 23 in the platform 11 adjacent its pivoted end and is pivotally connected at its lower end as at 24 to a sliding rod 25, the rod extending beyond the forward edge of the platform 11 as shown in Figures 1 to 3 and being supported adjacent its forward end by the strap 26 depending from the free swinging end of the platform. The bell crank lever being influenced by the spring 19 to cause forward projecting movement of the rod 25, such rod is limited in its forward movement by the stop block 27 carried by the rod that moves into engagement with the strap 26, the stop block and strap being illustrated in full lines as engaged with each other in Figure 2 while the block is separated from the strap as illustrated by dotted lines in said figure. A laterally movable spring finger 28 having a hook 29 upon its lower end thereof depends from the top wall 2 of the trap casing and being engaged by the forward end of the rod 25 forms a support for holding the platform 11 in its elevated horizontal set position.

From the above detailed description of the invention, it is believed that the construction and operation thereof will at once be understood, it being noted that when the trip platform 11 is in the full line position as illustrated in Figure 1, the same is so supported by the forward end of the rod 25 engaging the hook 29 of the spring finger 28, the rod being forwardly projected by its attachment with the bell crank lever that is influenced by the spring 19, forward movement of the rod 25 being limited by the stop block 27 engaging the strap 26. Bait of any character is attached to the hooks 17 above the bait plate 18 and when a rodent mounts the platform 11 and attempts to remove the bait from the hook 17, the plate 18 will be lowered against the tension of the spring 19 to cause pivotal movement of the bell crank lever and retraction of the rod 25 to the dotted line position shown in Figure 2 to disengage the forward end of the rod 25 from the hook 29 on the lower end of the spring finger 28. The weight of the rodent upon the trip platform 11 will tilt the same by causing the platform to spring downwardly upon its pivotal support to precipitate the rodent into the water tank 6 disposed therebeneath. The hood 9 will act as a buffer to prevent the escape of the rodent at the rear side of the trap. As shown in Figure 1, the shaft 10 carries an angle arm extension 30 at one end thereof upon which a weight 31 is adjustably mounted and which is employed for raising the trip platform to its set position. During upward movement of the platform, the rod 25 is first projected when pressure on the bait plate 18 is removed, the forward end of the rod 25 wiping over the open side of the hook 29 as illustrated by dotted lines in Figure 6 to be received within the hook for supporting the platform in its horizontal set position. The tank 6 may be removed at any time desired for disposing of trapped rodents and for refilling with water or other liquid.

While there is herein shown and described the preferred embodiment of the invention, it is nevertheless to be understood that minor changes may be made therein without departing from the spirit and scope of the invention as claimed.

What I claim as new is:—

1. In a trap of the class described, a trap casing having an opening in its upper side, a trip platform pivotally supported in the opening, a bell crank lever supported on the trip platform with one leg above the platform and the other leg extending below the same, a rod attached to the end of the lower leg, a support for the free end of the rod depending from the platform, a keeper for the end of the rod carried by the casing, and a coil spring carried by the platform engaging the upper leg of the lever for moving the rod toward its keeper.

2. In a trap of the class described, a trap casing having an opening in its upper side, a trip platform pivotally supported in the opening, a bell crank lever supported on the trip platform with one leg above the platform and the other leg extending below the same, a rod attached to the end of the lower leg, a support for the free end of the rod depending from the platform, a keeper for the end of the rod carried by the casing, a coil spring carried by the platform engaging the upper leg of the lever for moving the rod toward its keeper, and a bait plate carried by the upper leg of the lever above the platform to effect release of the rod from its keeper when the bait plate is lowered against spring tension thereon.

3. In a trap of the class described, a trap casing having an opening in its upper side, a trip platform pivotally supported in the opening, a bell crank lever supported on the trip platform with one leg above the platform and the other leg extending below the same, a rod attached to the end of the lower leg, a support for the free end of the rod depending from the platform, a keeper for the end of the rod carried by the casing, a coil spring carried by the platform engaging the upper leg of the lever for moving the rod toward its keeper, and a block on the rod to engage the support to limit movement of the rod toward the keeper.

4. In a trap of the class described, a trap casing having an opening in its upper side, a trip platform pivotally supported in the opening, a bell crank lever supported on the trip platform with one leg above the platform and the other leg extending below the same, a rod attached to the end of the lower leg, a support for the free end of the rod depending from the platform, a keeper for the end of the rod carried by the casing, a coil spring carried by the platform engaging the upper leg of the lever for moving the rod toward its keeper, a bait plate carried by the upper leg of the lever above the platform to effect release of the rod from its keeper when the bait plate is lowered against spring tension thereon, and a block on the rod to engage the support to limit movement of the rod toward the keeper.

5. In a trap of the class described, a trap casing having an opening in its upper side, a trip platform pivotally supported in the opening, a bell crank lever supported on the trip platform with one leg above the platform and the other leg extending below the same, a rod attached to the end of the lower leg, a keeper for the end of the rod carried by the casing, a spring interposed between the platform and upper leg of the lever for moving the rod toward its keeper and cooperating means carried by the platform and rod for supporting the rod parallel with the platform and limiting movement of the rod toward its keeper under influence of the spring.

In testimony whereof I affix my signature.

FRANK BONCHINA.